March 22, 1960  E. H. KOSSWIG  2,929,117
STERILIZING HOLDER FOR SYRINGE PARTS
Filed March 25, 1958
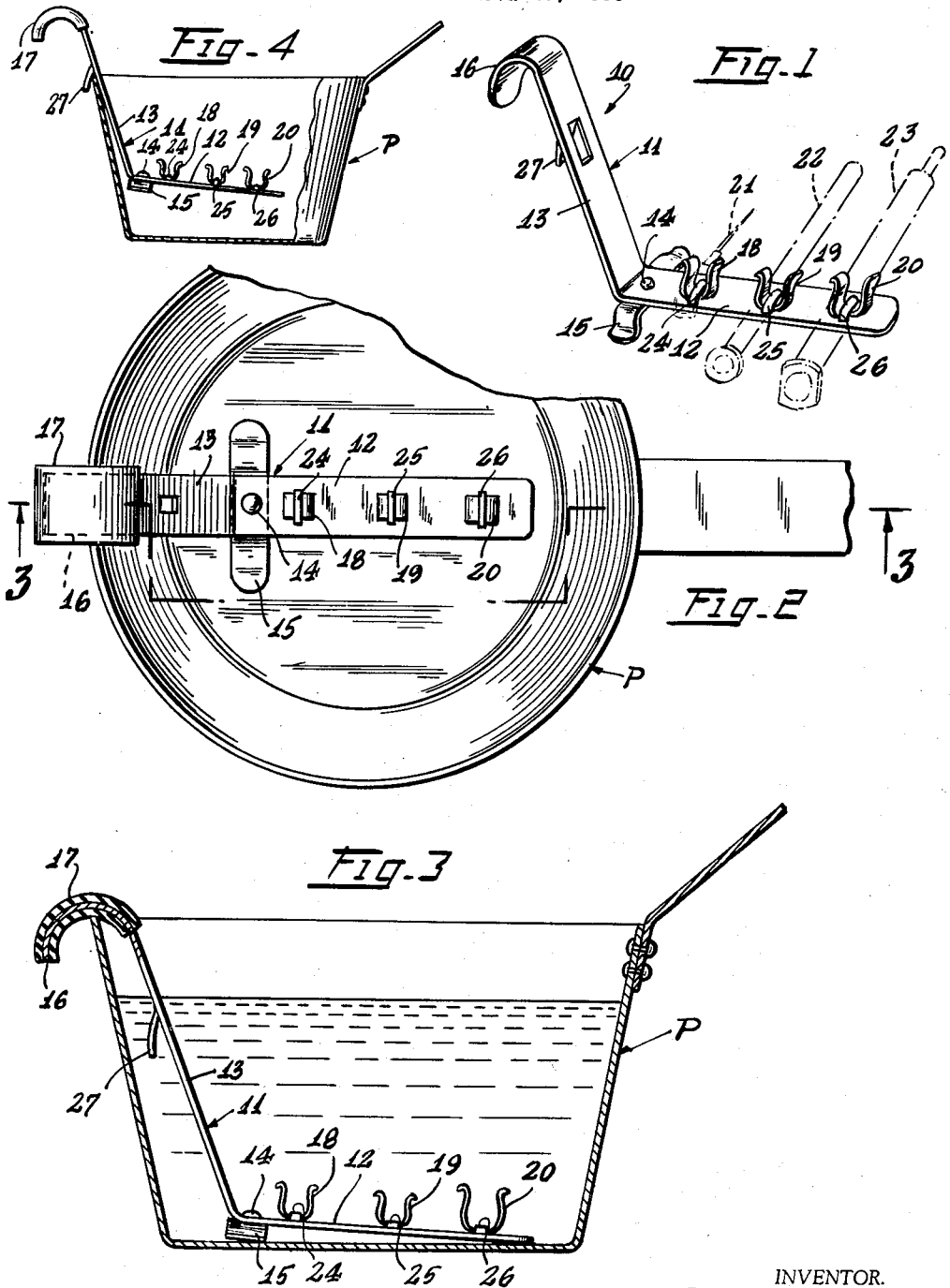
INVENTOR.
ERNEST H. KOSSWIG
BY
H. G. Manning
ATTORNEY.

United States Patent Office 2,929,117
Patented Mar. 22, 1960

2,929,117

STERILIZING HOLDER FOR SYRINGE PARTS

Ernest H. Kosswig, Farmington, Conn.

Application March 25, 1958, Serial No. 723,915

1 Claim. (Cl. 21—86)

My invention relates to sterilizers, and is directed particularly to a holder for sterilizing the components parts of a hypodermic syringe.

The principal object of my invention is to provide a holder for detachably supporting such hypodermic syringe parts while sterilizing them in a pan of boiling water prior to use by diabetics, or other patients, nurses, physicians, surgeons, etc., at home or in a hospital.

Another object is to provide a holder of the above nature having a horizontal base section for supporting the barrel, plunger, and needle portions of the syringe, in an elevated position slightly above the bottom of a pan of hot water in which it is placed for sterilizing.

A further object is to provide a holder of the above nature having an end hook for temporarily supporting the sterilized parts in a raised position for cooling them within the sterile atmosphere of the pan after the hot water has been poured out of said pan.

Another object is to provide a syringe holder of the character described, which comprises a narrow angular strip of metal having a base portion and a handle portion, said base portion having on its upper side a plurality of spring U-clips for supporting the individual parts of the syringe, and having on its lower side a swiveled support which is movable after use into alignment with said base portion for compact storage.

Still another object of the invention is to provide a holder of the above nature which is foolproof in operation, simple in construction, low in cost, rust-proof, and very efficient and durable in use.

Other objects, features and advantages of the invention will be apparent from the following description when read with reference to the accompanying drawing.

In the drawing,

Fig. 1 is a perspective view of a sterilizing holder for the three separate parts of a syringe, constructed according to the invention, Fig. 2 is a top plan view showing the holder located in sterilizing position within a pan of hot water, Fig. 3 is a vertical cross-sectional view, taken along the line 3—3 of Fig. 2, looking in the direction of the arrows, and Fig. 4 is a vertical cross-sectional view similar to Fig. 3, on a smaller scale, showing the holder when the intermediate exterior lug on the handle is supported on the rim of the pan with the parts of the syringe located in the sterile atmosphere of the empty pan, after sterilization.

Referring now in detail to the drawings, wherein like reference numerals denote corresponding parts throughout the several views, the numeral 10 designates generally a sterilizing syringe holder embodying the invention, the same comprising a body member 11 formed of a narrow strip of metal, such as stainless steel, bent to provide a substantially horizontal base portion 12 and an upwardly and outwardly-inclined handle portion 13. Swivelly attached to the underside of the base portion 12 near the angular bend thereof, as by a rivet 14, is an inverted resilient U-shaped support foot 15. As best seen in Figs. 2 and 3, when the holder 10 is in use, the support foot 15 will be turned at right angles to the base portion 12 to serve as a rest for maintaining said base portion spaced above the bottom of the pan P of boiling water, thus preventing direct contact of the parts being sterilized with the pan which might cause breakage of the parts, cause them to become brittle, or adversely affect the hardness thereof.

The upper end of the handle portion 13 of the holder 10 is outwardly and downwardly curved into the form of a convex hook 16, as illustrated in Figs. 2 and 3 of the drawing, and said hook 16 is preferably covered with a heat-insulating sleeve 17, such as plastic or rubber.

Secured in spaced relation along the upper surface of the base portion 12 of the sterilizing holder 10, are three upstanding U-shaped spring-metal clips 18, 19, and 20, which are adapted to serve as clamps for detachably holding a metallic needle portion 21, a glass plunger portion 22 and a transparent glass barrel portion 23 respectively of a hypodermic syringe, indicated in Fig. 1. The clips 18, 19, and 20 are preferably secured in place by means of open-ended cross lugs 24, 25, and 26, respectively, struck up from the base portion 12 and pressed against the bases of said clips 18, 19, 20, which are disposed under said lugs 24, 25, 26.

The handle portion 13 of the sterilizing holder 10 has an outwardly-struck downwardly extending exterior intermediate lug 27 located below the end hook 16 of said handle portion, by means of which the holder can be hung over the rim of the pan P in the sterile atmosphere of said pan after pouring the hot water out of said pan (see Fig. 4).

*Operation*

In use, the syringe parts 21, 22, 23 to be sterilized, will first be inserted crosswise within the spring metal clips 18, 19, and 20, as illustrated by dotted lines in Fig. 1. The holder 10 will then be placed, by means of the handle 16, in the pan of water P, which is then heated to boiling, and the parts will be kept therein the required length of time for complete sterilization.

It will be seen that the resilient support foot 15 raises one end of the base portion 12 of the sterilizing holder 10 so as to elevate the syringe parts from the bottom of the pan, allowing proper water circulation and preventing direct heat conduction from the bottom of the pan to said syringe parts.

After the sterilized parts of the syringe have been cooled, by placing the holder in the position shown in Fig. 4, the separate parts of the syringe may be assembled together prior to use without danger of contamination.

After use, the swiveled support foot 15 may be turned 90 degrees about its attachment rivet 14, for compact storage of the sterilizing holder until it is to be used again.

It will also be understood that, if desired, the body member 11 of the sterilizing holder may be constructed of two separate parts suitably hinged together to permit collapsing of the same for compact storage.

While only one form of the invention is described herein, it is to be understood that this form is presented by way of example only, and that the invention is not to be limited thereto, but may be modified and embodied in various other equivalent forms, without departing from its spirit. In short, the invention includes all the modifications and embodiments coming within the scope of the appended claim.

What is claimed as new and for which it is desired to obtain Letters Patent is:

In a sterilizing holder for the detachable needle, plunger and barrel of a hypodermic syringe, a narrow base portion, one end of which is adapted to rest on the bottom of a pan of hot water, the other end of said base portion having an upwardly inclined handle portion integrally formed therewith, a U-shaped swivel member connected to the bottom of the handle end of said base portion for holding the syringe parts in elevated relation with respect to the bottom of said pan, said base portion having a plurality of upwardly extending U-shaped clip members for clamping said separate syringe parts in freely suspended position within said pan, said base portion being formed of a narrow strip of metal, and said clip members being secured to said base portion by means of lugs struck up from said base portion for embracing said clips, the upper end of said handle having a downturned convex hook which is provided with a heat-insulating sleeve fitted thereover, said handle portion being provided with an intermediate struck-out lug for suspending said holder in an elevated position over the edge of said pan with the syringe parts in the sterile atmosphere of said pan after the hot water has been poured out following the sterilizing operation.

References Cited in the file of this patent

UNITED STATES PATENTS 2,018,651    Bates _____ Oct. 29, 1935

FOREIGN PATENTS 819,431    Great Britain _____ July 5, 1937

UNITED STATES PATENT OFFICE

CERTIFICATE OF CORRECTION

Patent No. 2,929,117 March 22, 1960

Ernest H. Kosswig

It is hereby certified that error appears in the printed specification of the above numbered patent requiring correction and that the said Letters Patent should read as corrected below.

Column 4, line 13, list of references cited, under "FOREIGN PATENTS", for

"819,431  Great Britain ----- July 5, 1937 read

-- 819,431  France ----------- July 5, 1937 --.

Signed and sealed this 6th day of September 1960.

(SEAL)
Attest:

ERNEST W. SWIDER
Attesting Officer

ROBERT C. WATSON
Commissioner of Patents